Patented Mar. 29, 1932

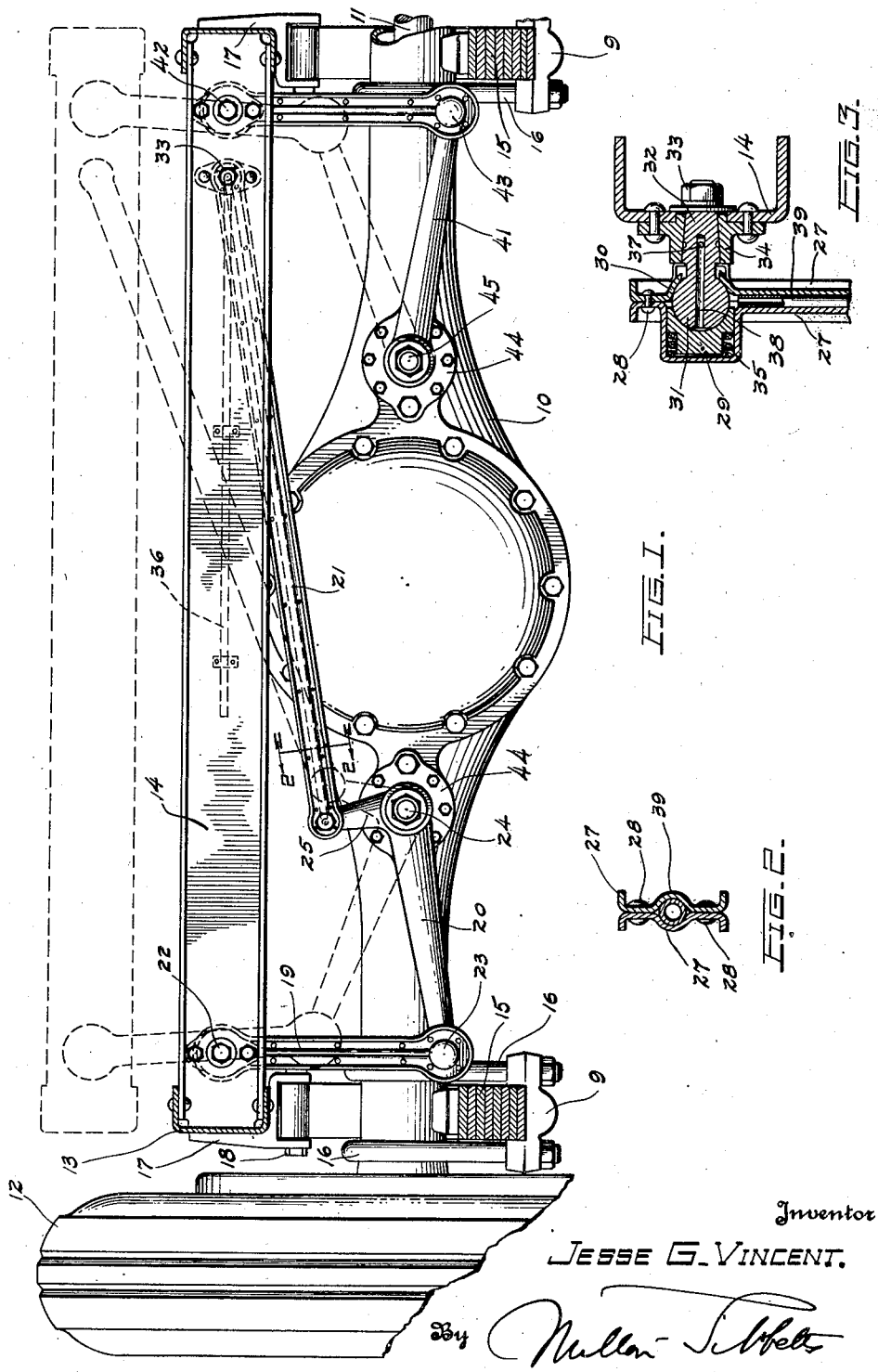

1,851,655

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 2, 1929. Serial No. 396,607.

This invention relates to motor vehicles, and more particularly to body stabilizing mechanism.

With the present manner of suspending the frame of a motor vehicle above the axles, side sway and tilting of the body relative to the axles occurs when the direction of travel is changed. Furthermore, an unbalanced weight on either side of the body will cause tilting or listing thereof. These conditions are objectionable to the occupants of the vehicle and decrease the life of the connecting means between the frame and the axles, and an object of the invention is to overcome such objectionable conditions through the provision of stabilizing mechanism.

Another object of the invention is to provide a motor vehicle with stabilizing mechanism which will eliminate side sway of the body through maintaining a parallel relation thereof relative to the axles.

Another object of my invention is to provide a motor vehicle in which the body is maintained in parallel relation with the axle through stabilizing means associated with one of a pair of shock absorbers.

Another object of my invention is to provide a motor vehicle in which stabilizing linkage is associated between the rear axle housing and the frame so that vertical motion will be transferred from one side to the other of the body in a manner to maintain the frame parallel with the axle housing and at the same time reduce the upward vertical movement of the side normally rising.

These and other objects of the invention will appear from the following description taken in connection with the drawings, which form a part of this specification, and in which:

Fig. 1 is a vertical sectional view taken transversely of the rear end of a motor chassis illustrating my invention in its associated relation therewith;

Fig. 2 is a sectional view of the stabilizing lever taken on line 2—2 of Fig. 1;

Fig. 3 is a sectional view illustrating the manner of attaching the stabilizing lever to the motor vehicle frame.

Referring now to the drawings by characters of reference, 10 represents the rear axle casing of a motor vehicle which houses the driven axle 11 with which the traction wheels 12 are associated. A frame is mounted in a plane above the rear axle and consists of side sills 13 and a plurality of transverse beams as shown at 14, such sills and beams being secured together as an integral structure. Longitudinally extending springs 15 are secured centrally to the rear axle housing by the U-bolts 16 and brackets 9, while the ends of the springs are pivotally connected with the frame by means of brackets 17 and bolts 18.

The motor vehicle chassis, above described, is of a conventional form, and it will be seen that the body carrying frame can tilt or sway sidewise relative to the rear axle. It is the purpose of this invention to provide stabilizing mechanism which will prevent sidesway or tilting of the body with respect to the axle.

To this end I provide a stabilizing linkage consisting of a vertically extending link 19, a bell crank lever 20, and a link 21 which are pivotally associated between the frame and the rear axle housing. The link 19 is pivotally mounted at its upper end to a bolt 22 which is secured adjacent one end of the transverse beam 14 and is pivotally connected at its lower end to one end of the horizontally extending arm of the bell crank 20 by a bolt 23. The bell crank 20 is pivotally connected to the axle housing by an element 24, and is formed with an upstanding arm 25 to which the link 21 is pivotally connected.

The link 21 extends transversely of the frame and is pivotally secured to the beam 14 adjacent the end thereof remote from the link 19. The link 21 is preferably formed of two sheet metal parts 27 which are secured together by rivets 28 and are formed similarly at each end. The ends of the link are provided with a housing for the reception of a bearing member 29 which together with a bearing portion 30, struck out from one of the link sections, forms a seat for the annular end 31 of a bolt 32 which is secured by the nut 33 in a bracket 34 fixed to the beam 14. A coil spring 35 is arranged within the bearing housing to press the bearing member 29 against the end of the bolt. The end of the link connected with the arm 25 is formed and associated therewith in a manner similar to that just described, and therefore a detailed description of this connection is not thought to be necessary.

A conduit 36, connected with a suitable lubricating system, is secured to the beam 14 and communicates with a passage 37 which extends transversely through the bolt 32 and leads to the axially extending passage 38. A conduit 39 is clamped between the two sections 27 of the stabilizing link and conducts lubricant to the bolt at the lower end thereof. It will be seen that lubricant will pass through the passages 37 and 38 to the surface of the annular bolt end, and that it will flow through the conduit 39 to the bolt associated with the extension 25 to which the other end of the stabilizing link is pivotally connected.

When the stabilizing linkage is not employed, unbalanced weight on one side of the frame or a change in the direction of the vehicle travel will cause side tilting, or list, of the frame and body relative to the axle. In changing the course of travel, the body can sway sidewise relative to the axles and the side of the frame corresponding to the new direction of travel will rise from the axle housing while the other side of the frame will move a similar distance in a vertical plane toward the axle housing. When the stabilized linkage is employed, and the direction of travel is changed or unbalanced weight is present, the stabilizer elements will move in the relation as shown in dotted lines in Fig. 1, thus allowing movement of the body in a vertical plane but parallel with the axle. The degree of such movement depends on the unbalanced weight or the centrifugal force which may be present. The arrangement of the stabilizer elements is such that vertical motion is transferred from one side of the frame to the other side thereof, and thus the side tending to rise will move vertically only one half the distance it would when the stabilizer is not in use.

I prefer that the stabilizing linkage be formed as a part of a shock absorbing system, and in such event the element 24 is the vane shaft of a shock absorber, and links 40 and 41 similar to the links 19 and bell crank 20 are provided. The link 40 is pivotally carried by a bolt 42 secured to the beam 14 and the lower end thereof is secured to an end of the horizontally extending link 41 by a bolt 43. The link 41 is fixed to a vane shaft 45, and the vane shafts 24 and 45 are carried by the shock absorber housings 44. For a detailed description of such a shock absorber system, attention is directed to application Serial No. 236,047 filed November 28, 1927 by Alfred Moorhouse. It will be understood that the stabilizing mechanism will function to maintain the body parallel with the rear axle either by itself or when associated with a shock absorber system, and also that the stabilizing mechanism will function equally as well if used with but not as a part of a shock absorbing system.

It will be seen that with the stabilizing device herein described, riding is made more comfortable for the occupants of a motor vehicle, and that the life of the suspension system is materially increased due to equalizing the stresses placed upon the connections thereof.

Although the invention has been described in connection with certain specific embodiments, the principles involved are susceptible to numerous other applications, as will readily occur to persons skilled in the art. The invention is therefore to be limited only as indicated by the scope of the appended claims.

What I claim is:

1. In a motor vehicle, an axle housing, a frame, and stabilizing linkage including a lever pivoted to the axle, a link pivoted to one side of the frame and said lever, and another link pivoted to the lever and the other side of the frame.

2. In a motor vehicle, an axle housing, a frame, springs supporting the frame above the axle housing, a bell crank lever pivoted to the axle housing and extending transversely of the frame, and a link pivoted to each end of the bell crank lever and to the frame.

3. In a motor vehicle, an axle housing, a frame, springs supporting the frame above the axle housing, a bell crank lever pivoted to the axle housing and extending transversely of the frame, a vertically extending link pivoted to one arm of the bell crank lever and to the frame, and a second link pivoted to the other end of the bell crank lever and to the side of the frame remote from that to which the vertical link is pivoted.

4. In a motor vehicle, an axle housing, a frame, springs supporting the frame above the axle housing, a bell crank lever pivoted to the axle housing at one side of the center of the frame, said lever extending transversely of the frame, a link pivoted to each end of the bell crank lever and to the frame, said links being pivoted to the frame on opposite sides thereof.

5. In a motor vehicle, an axle housing, a frame, springs supporting the frame above the axle housing, a pair of pivoted links between one end of the axle housing and the frame, and another linkage pivoted to the other end of the axle housing, and to both sides of the frame.

6. In a motor vehicle, an axle housing, a frame, springs supporting the frame above the axle housing, a bell crank lever pivoted to the axle housing and extending transversely of the frame, means retarding the normal pivotal movement of the bell crank lever, and links pivoted to each end of the bell crank lever and one to each side of the frame.

7. In a motor vehicle, an axle housing, a frame, springs supporting the frame above the axle housing, a lever and a link pivoted to the axle housing, means restraining the normal movement of the lever and the link pivoted to the axle housing, links connecting the ends of the lever to opposite sides of the frame, and a link connecting the restrained link to one side of the frame.

In testimony whereof I affix my signature.

JESSE G. VINCENT.